United States Patent Office 2,842,574
Patented July 8, 1958

2,842,574

PRODUCTION OF α-LIPOIC ACID INTERMEDIATES

Edward Walton, Scotch Plains, N. J., assignor to Merck & Co., Inc., Rahway, N. J., a corporation of New Jersey No Drawing. Application April 25, 1956
Serial No. 580,476

2 Claims. (Cl. 260—399)

This invention relates to the production of α-lipoic acid. More particularly, this invention is concerned with novel processes of producing dithiolalkanoic acids and salts thereof of the formula

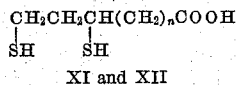

XI and XII wherein $n$ is an integer from 1 to 8 and novel intermediate compounds useful in such processes. It is also concerned with novel methods of producing (+) and (—) pure enantimorphic forms of α-lipoic acid.

Compounds of the above formula are valuable in the production of other chemical compounds. Thus, compounds in which $n$ is 4, i. e., 6,8-dithioloctanoic acid, are particularly useful precursors in the synthesis of α-lipoic acid or 5-[3-(1,2-dithiacyclopentyl)] pentanoic acid. In this regard, [5-[3-(1,2-dithiacyclopentyl)]] pentanoic acid is a valuable growth stimulating substance which was obtained from liver and later reported to have the structure

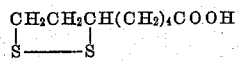

as is disclosed in the J. Am. Chem. Soc. 74, 3455 (1952).

Production of the dithiolalkanoic acids is achieved by a novel sequence of reactions which shall be illustrated hereinafter by specific methods of producing 6,8-dithioloctanoic acid and its pure enantiomorphic forms. These reactions, however, are not to be considered restricted to production of this compound since they are equally applicable to the production of the corresponding analogs in which $n$ may be 1 or an integer up to and including 8.

The production of 6,8-dithioloctanoic acid according to the subject invention may be conveniently considered in terms of two related phases. In Phase A, a 7-monoester of 7-carboxy-2-heptenoic acid (I) is converted by novel processes to 6-thiol-8-hydroxyoctanoic acid (VIII). In Phase B, 6-thiol-8-hydroxyoctanoic acid, the 6-acylthio precursors hereto and esters of such compounds are converted to 6,8-dithioloctanoic acid.

The first sequence of reactions in Phase A comprises reacting a 7-monoester of 7-carboxy-2-heptenoic acid (I) with a thiocarboxylic acid to produce the corresponding 7-monoester of a 3-acylthio-7-carboxyheptanoic acid (II), halogenating said compound to produce the corresponding heptanoyl halide (III), and reducing said compound with an alkali metal borohydride to form the corresponding ester of the 6-acylthio-8-hydroxyoctanoic acid (IV). The ester of 6-acylthio-8-hydroxyoctanoic acid (IV) may then be converted to 6-thiol-8-hydroxyoctanoic acid according to one method by treating said compound with a base to form directly the corresponding ester of 6-thiol-8-hydroxyoctanoic acid (VI), treating said ester with sufficient base to form the corresponding dimetal salt (VII) and treating said salt with acid to form the desired 6-thiol-8-hydroxyoctanoic acid (VIII). In a variation of this process the ester of 6-acylthio-8-hydroxyoctanoic acid (IV) may be treated with sufficient base to form a mono-salt of the 6-thiol-8-hydroxyoctanoate (V) which may then be treated with acid to form the corresponding ester of 6-thiol-8-hydroxyoctanoic acid (VI). Alternatively, the ester of 6-acylthio-8-hydroxyoctanoic acid (IV) may be treated with an excess of base to form a dimetal salt of 6-thiol-8-hydroxyoctanoic acid (VII) which, as previously indicated, may be treated with acid to liberate the free acid (VIII). These reactions may be represented as follows:

PHASE A

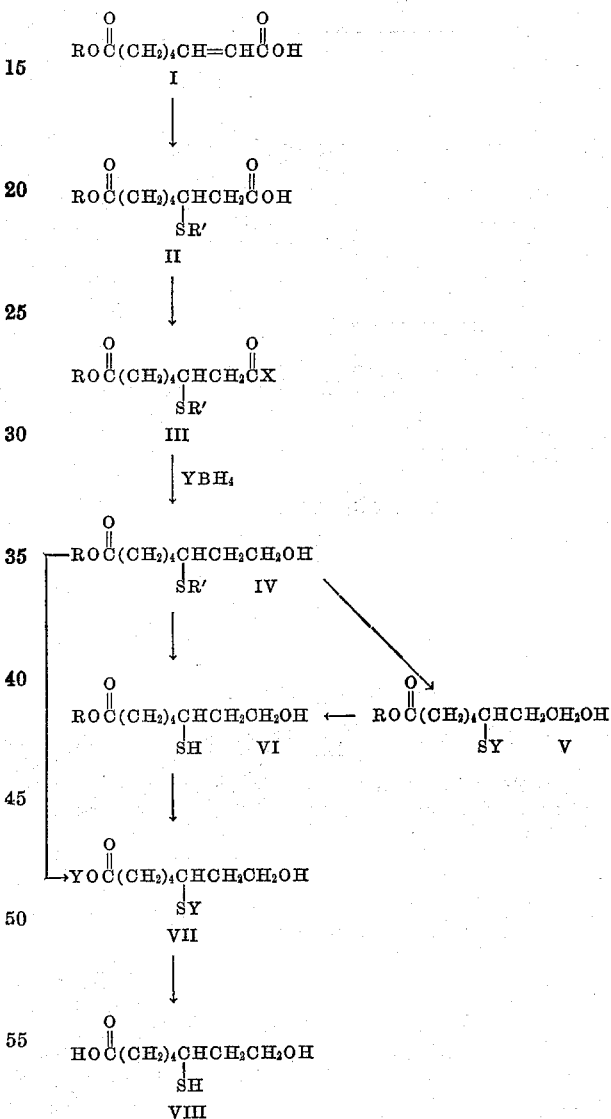

wherein R is a hydrocarbon group such as an alkyl, alkenyl, aryl or aralkyl group, and particularly such groups having 1 through 8 carbons. R' is an acyl group such as an alkylacyl, alkenylacyl, arylacyl or aralkacyl group, and particularly such acyl groups derived from carboxylic acids and having 1 through 8 carbons, X is an anion of a strong acid and Y is an alkali metal or alkaline earth metal.

The production of 6,8-dithioloctanoic acid is achieved according to Phase B by reacting 6-thiol-8-hydroxyoctanoic acid, 6-acylthio precursors thereof or esters thereof, produced as indicated above, with thiourea or an N-substituted thiourea in the presence of a strong acid to form 6-thiol-8-[2-(2-thiopseudoureido)] octanoic acid or the corresponding N-substituted thiopseudoureide as an acid addition salt IX, neutralizing said salt to form the free base X, hydrolyzing said compound with a base to form the corresponding tri-alkali metal salt of 6,8-dithioloctanoic acid XI and treating said salt with acid to form 6,8-dithioloctanoic acid. This process may be conveniently represented as follows:

PHASE B

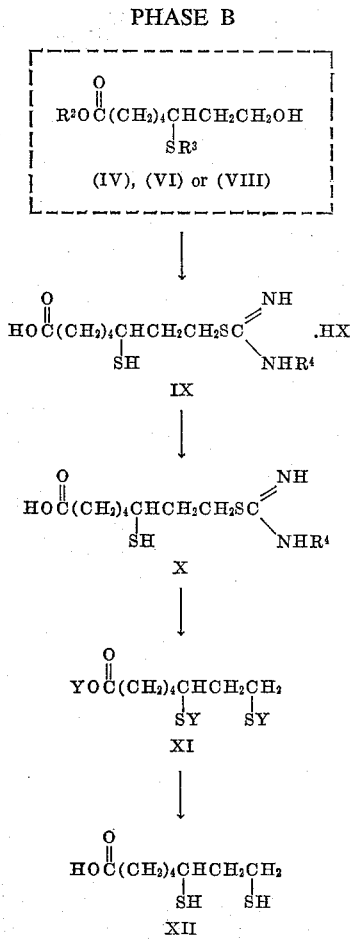

wherein $R^2$ and $R^4$ are hydrogen or hydrocarbon groups such as alkyl, alkenyl, aryl and aralkyl groups, particularly such groups having 1 through 8 carbons. $R^3$ is hydrogen or an alkylacyl, alkenylacyl, arylacyl, or aralkylacyl group, particularly such groups derived from carboxylic acids having 1 through 8 carbons, and Y is an alkali metal or alkaline earth metal, and X is an anion of a strong acid.

The starting materials which are used in this invention are readily prepared by methods known in the art. Thus, 7-monoesters of 7-carboxy-2-heptenoic acid and similar homologs may be prepared as disclosed in the J. Org. Chem. 12, 160 (1947). Examples of such compounds which may be prepared are 7-carbomethoxy-2-heptenoic acid, 7-carboethoxy-2-heptenoic acid, 7-carbopropoxy-2-heptenoic acid, 7-carbophenoxy-2-heptenoic acid, 7-carbobenzyloxy-2-heptenoic acid and homologs thereof.

The first reaction in this process is effected by contacting a 7-monoester of 7-carboxy-2-heptenoic acid with a thiocarboxylic acid to produce the corresponding 7-monoester of the 3-acylthio-7-carboxy heptanoic acid. Thiocarboxylic acids such as thioacetic acid, thiopropionic acid, thiobutyric acid, thiovaleric acid, thiocaproic acid, thiobenzoic acid, and thiophenylacetic acid are some examples of compounds which are useful reactants in this step. The reaction proceeds in the presence of an inert solvent such as benzene, chloroform, carbon tetrachloride, toluene, dioxane and ethanol. The reaction can be effected at room temperature or elevated temperatures up to about 70° C. It is completed in about 4 to 12 hours depending on the reaction temperature. The product is recovered from the reaction mixture by ordinary procedures such as by extraction into a water-immiscible solvent, washing the organic extract with water and removing the solvent under reduced pressure.

In a specific illustration of this reaction, thioacetic acid is reacted with 7-carboethoxy-2-heptenoic acid to produce 3-acetylthio-7-carboethoxyheptanoic acid. Other compounds produced in the described manner from the appropriate reactants that might be mentioned are 3-propionylthio-7-carbomethoxyheptanoic acid, 3-butyrylthio-7-carbophenoxyheptanoic acid, 3-benzoylthio-7-carbopropoxyheptanoic acid, 3-phenylacetylthio-7-carboethoxyheptanoic acid, and the like.

In the United States patent application of Walton and Wagner, Serial No. 445,166, filed July 22, 1954, now Patent No. 2,792,413, there is disclosed a method of resolving 3-acetylthio-7-carboethoxyheptanoic acid into its (+) and (−) enantiomorphic forms. Such resolved forms of this compound, as well as its racemic form may be employed in the following reactions, and accordingly the resulting products produced therefrom will be the appropriate enantiomorphic forms.

The 7-monoester of the 3-acylthio-7-carboxyheptanoic acid prepared above is then reacted with a halogenating agent to produce the corresponding 7-monoester of the 3-acylthio-7-carboxyheptanoyl _halide. This may be achieved by contacting the heptanoic acid with halogenating agents such as thionyl chloride, phosphorous oxychloride, phosphorous trichloride or tribromide and phosphorous pentabromide or pentachloride. The reaction is conveniently achieved under solvent conditions attained either by use of an excess of the halogenating agent or by the use of an inert solvent such as benzene, ether, dioxane and the like. Room temperature or slightly elevated temperatures may be employed for the reaction. Following completion of the reaction, the desired 7-monoester of the 3-acylthio-7-carboxyheptanoyl halide may be recovered from the reaction mixture by removal of the excess halogenating agent and/or solvent. The usual procedures of extraction and evaporation can be used for this purpose.

Illustrative of the novel compounds which are produced in this manner are 3-acetylthio-7-carboethoxy-heptanoyl chloride and the (+) and (−) forms thereof by the reaction of 3-acetylthio-7-carboethoxyheptanoic acid and the (+) and (−) forms thereof with thionyl chloride or another suitable chlorinating agent. The corresponding bromides are also produced in this way using thionyl bromide as the halogenating agent. Similarly, compounds such as 3-propionylthio-7-carbomethoxyheptanoyl chloride and 3-benzoylthio-7-carbophenoxyheptanoyl bromide are produced from the appropriate heptanoic acids.

The 7-monoester of the 3-acylthio-7-carboxyheptanoyl halide produced as above is subsequently treated with an alkali metal borohydride to effect reduction of the heptanoyl halide to the corresponding heptanol or ester of the 6-acylthio-8-hydroxyoctanoate. Alkali metal borohydrides such as sodium, potassium and lithium borohydride and sodium trimethoxy borohydride may be used to effect the desired reduction. The reaction is conveniently effected at room or slightly elevated temperatures in about 1 to 4 hours under solvent conditions. Inert solvents such as dioxane, benzene, ether, hexane and chloroform may be used and it is preferred that the reaction mixture be substantially anhydrous. After the reaction has gone to completion, water is added to decompose the excess alkali metal borohydride, followed by the addition of acid such as sulfuric, hydrochloric, hydrobromic and the like until the mixture is neutral or slightly acidic. The principal product obtained from the reaction is the corresponding ester of the 6-acylthio-8- hydroxyoctanoic acid. However, small amounts of side products are also produced as a result of the formation of an alkali metal hydroxide during the reaction which effects partial hydrolysis of the acyl groups before the reduction is complete. Thus, products such as the corresponding ester of 6-mercapto-8-hydroxy octanoic acid and 6-mercapto-8-hydroxy octanoic acid itself are also formed in small amounts during the reaction. The presence of these compounds is not detrimental to the process, however, because in the following steps all of these compounds are converted to the desired end product. It is accordingly unnecessary to separate such products before continuing with the next reaction.

According to a specific illustration of the described reduction 3-acetylthio-7-carboethoxyheptanoyl chloride is reacted with sodium borohydride to form ethyl 6-acetylthio-8-hydroxyoctanoate. This reaction may be repeated with the (+) and (−) enantiomorphic forms of the starting material to produce said product in an optically active form. In a like manner, using the appropriate precursor, there is obtained compounds such as methyl 6-propionylthio-8-hydroxyoctanoate and phenyl 6-benzoylthio-8-hydroxyoctanoate.

Conversion of the esters of 6-acylthio-8-hydroxyoctanoic acid (IV) to esters of 6-thiol-8-hydroxyoctanoic acid and to metal salts thereof is conveniently achieved by treatment with a base. By employing suitable equivalent amounts of base the hydrolysis may be effected so as to produce completely or partially saponified products. Thus, use of three equivalents of base gives a dimetal salt of 6-thiol-8-hydroxyoctanoic acid (VII) which when treated with acid is converted to 6-thiol-8-hydroxyoctanoic acid.

Alternatively, treatment of the ester (IV) with approximately one equivalent of base will afford the corresponding carboxylic acid ester of 6-thiol-8-hydroxyoctanoic acid (VI). This latter compound may then be treated with additional base, one equivalent leading to the mono-metal salt of the 6-thiol-8-hydroxyoctanoic ester (V), and two equivalents giving a di-metal salt of the free octanoic acid.

Alkali metal or alkaline earth metal hydroxides or carbonates are the preferred bases for effecting the saponifications discussed above. The reactions are conveniently accomplished by intimately contacting the base and octanoic acid derivative in an aqueous organic solvent such as aqueous methanol or ethanol. Warming the reaction mixture serves to promote the hydrolysis. The end product may be recovered from the reaction mixture by conventional methods.

The metal salts obtained by treatment of a 6-acylthio-8-hydroxyoctanoic acid ester with base are converted to 6-thiol-8-hydroxyoctanoic acid by treatment with acid such as sulfuric, hydrochloric, hydrobromic and the like.

Referring now to Phase B, the first reaction in this process comprises contacting 6-thiol-8-hydroxyoctanoic acid, 6-acylthio precursors thereof and esters thereof with thiourea or an N-substituted thiourea to form 6-thiol-8-[2-(2-thiopseudoureido)] octanoic acid or the corresponding N-substituted thiopseudoureide. Examples of starting materials of the type which may be used in this reaction are those compounds previously disclosed hereinabove such as 6-thiol-8-hydroxyoctanoic acid and esters thereof such as the methyl, ethyl, propyl, butyl, phenyl benzyl and phenylethyl and 6-acylthio precursors thereof such as ethyl 6-acetylthio-8-hydroxyoctanoate, methyl 6-propionylthio-8-hydroxyoctanoate and phenyl 6-benzoylthio-8-hydroxyoctanoate. In addition to thiourea, N-hydrocarbon substituted thioureas such as N-methylthiourea, N-ethylthiourea, N-phenylthiourea, and N-benzylthiourea may be employed in the reaction. The desired reaction is conveniently achieved by contacting the reactants in the presence of a strong acid such as a mineral acid or Lewis acid in aqueous anhydrous solution at room temperature or elevated temperatures, preferably at the reflux temperature. Hydrochloric acid, hydriodic acid, hydrobromic acid, sulfuric acid, boron trifluoride and aluminum chloride are examples of acids suitable for use in this reaction. The reaction is completed quickly and the desired product may be conveniently isolated in the form of an acid addition salt by conventional methods.

According to the described method, 6-thiol-8-hydroxyoctanoic acid is reacted with thiourea in the presence of hydrogen bromide to produce 6-thiol-8-2-(2-thiopseudoureido) octanoic acid hydrobromide. By replacing hydrobromic acid with a different acid other acid addition salts thereof may be produced. In a similar manner, but employing the appropriate N-substituted thiourea there are obtained acid addition salts of 6-thiol-8-[2-(1-propyl-2-thiopseudoureido)] octanoic acid, 6-thiol-8-[2-(1-benzyl-2-thiopseudoureido)] octanoic acid and 6-thiol-8-[2-(1-phenyl-2-thiopseudoureido)] octanoic acid. By neutralizing the acid addition salts of 6-thiol-8-[2-(2-thiopseudoureido)] octanoic acid and the N-substituted thiopseudoureide compounds the corresponding free bases may be produced and isolated by known techniques.

A 6,8-dithioloctanoic acid tri-metal salt is subsequently produced either by treating a 6-thiol-8-2-(2-thiopseudoureido) octanoic acid or similar N-substituted thiopseudoureide compound in the form of the free base or as an acid addition salt thereof, with a suitable base in sufficient quantity to effect the desired result. Inorganic bases such as alkali metal and alkaline earth metal carbonates and hydroxides may be used to effect this reaction. The reaction is conveniently carried out in aqueous solution at ordinary or elevated temperatures, such as at the reflux temperature. After the reaction has been completed the resulting salt may be recovered if desired. Preferably, however, the reaction mixture is treated directly with acid to convert such salts to 6,8-dithioloctanoic acid.

By treating 6,8-dithioloctanoic acid with a mild oxidizing agent such as iodine-potassium iodide, α-lipoic acid is formed. The (+)-α-lipoic acid and (−)-α-lipoic acid forms are similarly produced by oxidation of the optically active forms of 6,8-dithioloctanoic acid.

The following examples are included to illustrate specific embodiments of the invention. It is understood, however, that the invention is not to be limited to the specific disclosure of these examples.

*Example 1*

3-ACETYLTHIO-7-CARBOETHOXYHEPTANOIC ACID

A solution of 11.4 g. of thioacetic acid and 20 g. of 7-carboethoxy-2-heptenoic acid is prepared and maintained at room temperature overnight. The solution is then extracted with 100 ml. of chloroform and the chloroform layer washed with four portions of ice-water. The organic extract is dried over anhydrous magnesium sulfate and evaporated under reduced pressure to obtain 3-acetylthio-7-carboethoxyheptanoic acid: neutralization equivalent; calc'd for $C_{12}H_{20}O_5S$ 276; found, 268.

In a second experiment run in a manner analogous to the above the end product had a refractive index of 1.4842 @ 24.5° C.

*Example 2*

3-BUTYRYLTHIO-7-CARBOPHENOXYHEPTANOIC ACID

To 100 ml. of benzene is added 8 g. of thiobutyric acid and 17 g. of 7-carbophenoxy-2-heptenoic acid. After standing at room temperature overnight the mixture is diluted with cold water and the solvents removed under reduced pressure to yield 3-butyrylthio-7-carbophenoxyheptanoic acid.

Similarly, by reacting other thiocarboxylic acids and the appropriate 7-monoester of 2-heptenoic acid there are produced other novel compounds such as 3-propionylthio-7-carbomethoxyheptanoic acid, 3-benzoylthio-7-carbopropoxyheptanoic acid and 3-phenylacetylthio-7-carboethoxyheptanoic acid.

Example 3

(+)-3-ACETYLTHIO-7-CARBOETHOXYHEPTANOYL CHLORIDE

A 20.6 g. sample of (+)-3-acetylthio-7-carboethoxyheptanoic acid is treated with 13.3 g. of thionyl chloride and held at room temperature overnight. The reaction mixture is worked up as in Example 5 to isolate 21.5 g. of (+)-3-acetylthio-7-carboethoxyheptanoyl chloride; $[\alpha]_D^{23}$ +49° (c., 1.42; benzene).

Example 4

(−)-3-ACETYLTHIO-7-CARBOETHOXYHEPTANOYL CHLORIDE

A 22.8 g. sample of (−)-3-acetylthio-7-carboethoxyheptanoic acid is treated with 14.8 g. of thionyl chloride. The mixture is kept at room temperature overnight and worked up as in Example 5 to yield 24.3 g. of (−)-3-acetylthio-7-carboethoxyheptanoyl chloride; $[\alpha]_D^{23}$ −36° (c., 1.4, benzene).

Example 5

3-ACETYLTHIO-7-CARBOETHOXYHEPTANOYL CHLORIDE

Approximately 6.4 g. of thionyl chloride is added to 10 g. of 3-acetylthio-7-carboethoxyheptanoic acid. The solution is kept at room temperature overnight and the excess thionyl chloride is removed by concentration under reduced pressure. Benzene is added to the residue and the benzene solution exaporated to dryness under reduced pressure; this is repeated and finally the 3-acetylthio-7-carboethoxyheptanoyl chloride is held under reduced pressure overnight to remove residual volatiles: neutralization equivalent calc'd for $C_{12}H_{19}O_4SCl$ 147; found, 145.

Example 6

3-BUTYRYLTHIO-7-CARBOPHENOXYHEPTANOYL CHLORIDE

A 5 g. sample of 3-butyrylthio-7-carbophenoxyheptanoic acid is treated with 4 g. of thionyl chloride at room temperature for 12 hours. The reaction mixture is worked up as in Example 5 to isolate the desired 3-butyrylthio-7-carbophenoxyheptanoyl chloride.

Similarly, 3-propionylthio-7-carbomethoxyheptanoyl chloride, 3-benzoylthio-7-carbophenoxyheptanoyl chloride, and 3-phenylacetylthio-7-carboethoxyheptanoyl chloride are produced by chlorination of the corresponding heptanoic acids. Likewise, the corresponding bromide compounds instead of the chlorides are produced in this manner with appropriate changes in the halogenating agent.

Example 7

ETHYL 6-ACETYLTHIO-8-HYDROXYOCTANOATE

To a suspension of 5.8 g. of sodium borohydride in 70 ml. of dioxane is added a solution of 8.5 g. of 3-acetylthio-7-carboethoxyheptanoyl chloride in 30 ml. of dioxane with stirring over a 15 minute period. An additional 2 g. of sodium borohydride is added and stirring is continued for 2 hours at 20–25° C. The reaction mixture is cooled to less than 10° C. and 30 ml. of water is added as rapidly as possible. Cold aqueous hydrochloric acid is then added to about pH 2. The reaction mixture is diluted to 300 ml. with water and extracted with chloroform. After washing with aqueous potassium bicarbonate and water, the chloroform extract is dried and concentrated under reduced pressure to yield ethyl 6-acetylthio-8-hydroxyoctanoate in which is mixed some ethyl 6-thiol-8-hydroxyoctanoate; $n_D^{25}$=1.49.

Example 8

ETHYL 6-ACETYLTHIO-8-HYDROXYOCTANOATE DERIVED FROM (−)-3-ACETYLTHIO-7-CARBOETHOXYHEPTANOYL CHLORIDE

Approximately 19 g. of sodium borohydride is suspended in 200 ml. of dioxane and 23.6 g. of (−)-3-acetylthio-7-carboethoxyheptanoyl chloride dissolved in 50 ml. of dioxane is added. The mixture is worked up in a manner similar to Example 7 to yield 15.9 g. of ethyl 6-acetylthio-8-hydroxy octanoate, B. P. 115–125° C./0.1 mm., derived from (−)-3-acetylthio-7-carboxyheptanoyl chloride; $[\alpha]_D^{23}$ +10.3° (c., 1.45; methanol).

Example 9

ETHYL 6-ACETYLTHIO-8-HYDROXYOCTANOATE DERIVED FROM (+)-3-ACETYLTHIO-7-CARBOETHOXYHEPTANOYL CHLORIDE 19 grams of sodium borohydride is suspended in 200 ml. of dioxane and 21 g. of (+)-3-acetylthio-7-carboethoxyheptanoyl chloride in 50 ml. of dioxane is added. The mixture is worked up as in Example 7 to yield 8.3 g. of ethyl 6-acetylthio-8-hydroxyoctanoate derived from (+) - 3 - acetylthio - 7 - carboethoxyheptanoyl chloride; $[\alpha]_D^{23}$=2° (c., 1.93; methanol).

Example 10

ETHYL 6-BUTYRYLTHIO-8-HYDROXYOCTANOATE

To a suspension of 5 g. of sodium borohydride in 50 ml. of ether is added 8 g. of 3-butyrylthio-7-carboethoxyheptanoyl chloride. The mixture is treated as in Example 7 to recover ethyl 6-butyrylthio-8-hydroxyoctanoate.

Similarly, from the corresponding heptanoyl chloride there is produced methyl 6-propionylthio-8-hydroxyoctanoate, phenyl 6-benzoylthio-8-hydroxyoctanote and ethyl 6-phenylacetylthio-8-hydroxyoctanoate.

Example 11

ETHYL 6-THIOL-8-HYDROXYOCTANOATE

A 4 g. sample of ethyl 6-acetylthio-8-hydroxyoctanoate, produced as in Example 7, is dissolved in ethanol with a few drops of phenolphthalein solution and dilute sodium hydroxide is added slowly while the solution is warmed. The dilute sodium hydroxide is added until it is no longer consumed rapidly, as evidenced by an increase in pH of the mixture. The mixture is cooled and acidified to pH 3. The ethanol is removed by evaporation under reduced pressure and the residual aqueous phase is extracted with chloroform. The chloroform solution is dried and concentrated to yield ethyl 6-thiol-8-hydroxyoctanoate.

This procedure is also followed to produce the appropriate optical isomers of ethyl 6-thiol-8-hydroxyoctanoate derived from (+) and (−) 3-acetylthio-7-carboethoxyheptanoyl chloride.

Further treatment of the ethyl esters with a base and then acid gives the corresponding racemate and the (+) and (−) enanthiomorphs of 6-thiol-8-hydroxyoctanoic acid.

Example 12

ETHYL 6-THIOL-8-HYDROXYOCTANOATE

About 3 g. of ethyl 6-butyrylthio-8-hydroxyoctanoate is added to 30 ml. of alcohol. The solution is warmed slowly as dilute sodium hydroxide is added until the butyryl group is hydrolyzed. This is effected when the pH shifts upon the addition of the sodium hydroxide. The alcohol is evaporated and ether added to the aqueous residue. The organic phase is separated, dried and evaporated to yield ethyl 6-thiol-8-hydroxyoctanoate.

This procedure is followed to produce other esters of 6-thiol-8-hydroxyoctanoic acid from the corresponding 6-acylthio compounds. Examples of other esters which are so produced are methyl 6-thiol-8-hydroxyoctanoate, propyl 6-thiol-8-hydroxyoctanoate, benzyl 6-thiol-8-hydroxyoctanoate and phenyl 6-thiol-8-hydroxyoctanoate.

Such compounds may be treated further with a base like sodium hydroxide followed by treatment with acid to convert such compounds to 6-thiol-8-hydroxyoctanoic acid.

Example 13

6-THIOL-8-HYDROXYOCTANOIC ACID AND ITS DI-SODIUM SALT

A 2.4 g. sample of ethyl 6-acetylthio-8-hydroxyoctanoate formed in Example 7 is added to a solution of 4 ml. of 30% aqueous sodium hydroxide in 10 ml. of methanol. A trace of zinc dust is added to maintain a reducing atmosphere and the mixture is refluxed for 1 hour. The solution containing the di-sodium salt of 6-thiol-8-hydroxyoctanoic acid is acidified with hydrochloric acid and extracted with chloroform. The chloroform extract is washed with aqueous potassium bicarbonate and the aqueous extract is acidified. It is extracted with chloroform and the chloroform is evaporated under reduced pressure to give 6-thiol-8-hydroxyoctanoic acid: neutralization equivalent; calc'd for $C_8H_{16}O_3S$, 192; found 193; $n_D^{25}=1.499$.

Example 14

6-THIOL-8-HYDROXYOCTANOIC ACID AND ITS DI-SODIUM SALT DERIVED FROM (+)-3-ACETYL-THIO-7-CARBOETHOXYHEPTANOYL CHLORIDE

A 8.2 g. sample of the product obtained in Example 9 is added to a solution of 14 ml. of 30% aqueous sodium hydroxide in 30 ml. of methanol. A trace of zinc dust is added and the mixture is refluxed for 1 hour. The solution containing the appropriate optical isomer of 6-thiol-8-hydroxyoctanoic acid di-sodium salt is treated as in Example 13 to recover the optical isomer as the free acid.

Example 15

6-THIO-8-HYDROXYOCTANOIC ACID AND ITS DI-SODIUM SALT DERIVED FROM (−)-3-ACETYL-THIO-7-CARBOETHOXYHEPTANOYL CHLORIDE

A 16.8 g. sample of ethyl 6-acetylthio-8-hydroxyoctanoate produced as in Example 8 is added to a solution of 28 ml. of 30% aqueous sodium hydroxide in 60 ml. of methanol. A trace of zinc dust is added and the mixture is refluxed for 1 hour. The solution of 6-thiol-8-hydroxyoctanoic acid di-sodium salt having the appropriate optical activity is then treated as in Example 13 to recover the optically active free acid.

Example 16

6-THIO-8-2-(2-THIOPSEUDOUREIDO) OCTANOIC ACID AND 6,8-DITHIOLOCTANOIC ACID AND ITS TRI-SODIUM SALT

A 7.9 g. sample of 6-thiol-8-hydroxyoctanoic acid produced as in Example 13 is refluxed in 50 ml. of 40% hydrobromic acid with 9.4 g. of thiourea for 7 hours. The reaction mixture containing 6-thiol-8-[2-(2-thiopseudoureido)] octanoic acid hydrobromide is neutralized with sodium hydroxide to yield a solution of 6-thiol-8-[2-(2-thiopseudoureido)] octanoic acid. Sodium hydroxide is added until the mixture is alkaline. It is refluxed to form the tri-sodium salt of 6,8-dithioloctanoic acid. The mixture is acidified with hydrochloric acid to form 6,8-dithioloctanoic acid which is extracted with chloroform. The product is isolated by evaporation of the chloroform.

Example 17

6-THIOL-8-[2-(2-THIOPSEUDOUREIDO)] OCTANOIC ACID AND 6,8-DITHIOLOCTANOIC ACID AND ITS TRI-SODIUM SALT DERIVED FROM (−)-3-ACETYLTHIO-7-CARBOETHOXYHEPTANOYL CHLORIDE

A 5 g. sample of 6-thiol-8-hydroxyoctanoic acid (derived from (−) - 3 - acetylthio-7-carboethoxyheptanoyl chloride and produced as in Example 15) is treated with thiourea and hydrobromic acid as in Example 16. The reaction mixture containing the related enantiomorphic form of 6-thiol-8-[2-(2-thiopseudoureido)] octanoic acid hydrobromide is worked up as in Example 16 to yield the corresponding enantiomorphic forms of 6-thiol-8[2-(2-thiopseudoureido)] octanoic acid, tri-sodium salt of 6,8-dithioloctanoic acid and 6,8-dithioloctanoic acid.

Example 18

6-THIOL-8-[2-(2-THIOPSEUDOUREIDO)] OCTANOIC ACID AND 6,8-DITHIOLOCTANOIC ACID AND ITS TRI-SODIUM SALT DERIVED FROM (+)-3-ACETYLTHIO-7-CARBOETHOXYHEPTANOYL CHLORIDE

A 5 g. portion of 6-thiol-8-hydroxyoctanoic acid (derived from (+) - 3 - acetylthio-7-carboethoxyheptanoyl chloride and produced as in Example 14) is treated with thiourea and hydrobromic acid as in Example 16. The reaction mixture containing the related enantiomorphic form of 6-thiol-8-[2-(2-thiopseudoureido)] octanoic acid hydrobromide is worked up as above to yield the corresponding enantiomorphic forms of 6-thiol-8-[2-(2-thiopseudoureido)] octanoic acid, tri-sodium salt of 6,8-dithioloctanoic acid and 6,8-dithioloctanoic acid.

Example 19

(−)-α-LIPOIC ACID

The 6,8-dithioloctanoic acid produced in Example 17 is dissolved in chloroform and treated with an aqueous solution of iodine-potassium iodide until the iodine color persists. The chloroform layer is washed with a dilute aqueous solution of sodium bisulfite to remove excess iodine. It is then dried and evaporated to yield a residue of (−)-α-lipoic acid. The product extracted with warm cyclohexane which on being cooled yields yellow crystals of essentially pure (−)-α-lipoic acid.

Example 20

(+)-α-LIPOIC ACID

The 6,8-dithioloctanoic acid produced in Example 18 is added to chloroform and oxidized with iodine-potassium iodide as in Example 19 to produce (+)-α-lipoic acid which is isolated as pure yellow crystals.

Example 21

6-THIOL-8-2-(2-THIOPSEUDOUREIDO) OCTANOIC ACID AND 6,8-DITHIOLOCTANOIC ACID AND ITS TRI-SODIUM SALT

A 2 g. portion of ethyl 6-acetylthio-8-hydroxy octanoate and ethyl 6-thiol-8-hydroxy octanoate produced in Example 7 is refluxed with 1.5 g. of thiourea and 10 ml. of 40% hydrobromic acid for 24 hours. The reaction mixture containing 6-thiol-8-[2-(2-thiopseudoureido)] octanoic acid hydrobromide is neutralized by sodium hydroxide to yield a solution of 6-thiol-8-[2-(2-thiopseudoureido)] octanoic acid. Sodium hydroxide is added until the mixture is alkaline and then the mixture is refluxed, thereby forming the tri-sodium salt of 6,8-dithioloctanoic acid. The mixture is acidified with hydrochloric acid to form 6,8-dithioloctanoic acid which is extracted into chloroform. The product is isolated by evaporation of the chloroform.

Example 22

(−)-7-CARBOETHOXY-3-ACETYLTHIOHEPTANOIC ACID AND THE l-EPHEDRINE SALT THEREOF

A solution of 5 g. of racemic-7-carboethoxy-3-acetylthioheptanoic acid in 50 ml. of ether was mixed with a solution of 3 g. of l-ephedrine in 50 ml. of ether. After the reaction mixture was kept at room temperature for a short time crystalline (−)-7-carboethoxy-3-acetylthioheptanoic acid l-ephedrine salt precipitated; M. P. 125–128° C. The product was recrystallized twice from methanol; M. P. 129–131° C.

A 2.25 g. portion of (−)-7-carboethoxy-3-acetylthioheptanoic acid l-ephedrine salt was suspended in 50 ml. of water and 40 ml. of ether. The mixture was acidified with dilute hydrochloric acid and the ether layer was separated. The aqueous phase was extracted with a second 40 ml. portion of ether. The combined ether layers were dried and concentrated under reduced pressure to yield (−)-7-carboethoxy-3-acetylthioheptanoic acid: $n_D^{25}$ +1.4840; $[\alpha]_D^{23}$ −6.8° (c., 8.5 in methanol).

*Example 23*

(+)-7-CARBOETHOXY-3-ACETYLTHIOHEPTANOIC ACID AND THE l-BENZHYDRYLAMINE SALT THEREOF

A solution of 153 g. of racemic-7-carboethoxy-3-acetylthioheptanoic acid in 1500 ml. of ether was treated with a solution of 91.5 g. of l-ephedrine in 1500 ml. of ether. The mixture was kept at 5° C. overnight and the precipitated crystalline (−)-7-carboethoxy-3-acetylthioheptanoic acid l-ephedrine salt removed; M. P. 123–127° C. The filtrate containing (+)-7-carboethoxy-3-acetylthioheptanoic acid l-ephedrine salt was treated with 500 ml. of water and acidified with hydrochloric acid. The ether layer was separated and the aqueous layer extracted with another portion of ether. The combined ether extracts were dried and concentrated under reduced pressure to yield 87 g. of (+)-7-carboethoxy-3-acetylthioheptanoic acid.

About 35 g. of the (+)-7-carboethoxy-3-acetylthioheptanoic acid dissolved in 200 ml. of isopropyl ether was treated with a solution of benzhydrylamine (obtained from 32 g. of benzhydrylamine hydrochloride) in 200 ml. of isopropyl ether. A crystalline benzhydrylamine salt of (+)-7-carboethoxy-3-acetylthioheptanoic acid was precipitated. It was recrystallized twice from isopropyl ether; M. P. 92–96° C.; $[\alpha]_D^{25}$ +1.3° (c., 8.06 in methanol).

A 14.0 g. portion of (+)-7-carboethoxy-3-acetylthioheptanoic acid benzhydrylamine salt was dissolved in 100 ml. of chloroform and 100 ml. of water was added. The mixture was acidified with hydrochloric acid and the chloroform layer separated. The chloroform layer was washed with water, dilute hydrochloric acid and twice more with water. The chloroform layer was dried and concentrated under reduced pressure to yield pure (+) - 7 - carboethoxy-3-acetylthioheptanoic acid; $[\alpha]_D^{23}$ +6.8° (c., 8.65 in methanol).

Various changes and modifications of the invention can be made and, to the extent that such variations incorporate the spirit of this invention, they are intended to be included within the scope of the appended claims.

What is claimed is:

1. A process which comprises reacting a compound of the formula—

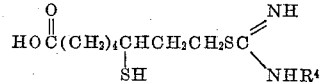

wherein $R^4$ is a member selected from the group consisting of hydrogen and hydrocarbon groups containing less than nine carbon atoms with an excess of an inorganic base selected from the group consisting of alkali metal and alkaline earth metal bases to produce the corresponding tri-metal salt of 6,8-dithioloctanoic acid.

2. A process which comprises reacting 6-thiol-8-[2-(2-thiopseudoureido)] octanoic acid with an excess of an alkali metal base to produce the corresponding tri-alkali metal salt of 6,8-dithioloctanoic acid.

References Cited in the file of this patent

Bullock: J. A. C. S. 74: 3455 (1952).